Oct. 27, 1970  C. W. LOTZ  3,536,591

MULTIPLE EFFECT DISTILLATION APPARATUS

Filed July 2, 1962

INVENTOR.
CHARLES W. LOTZ
BY
ATTORNEY

United States Patent Office 3,536,591
Patented Oct. 27, 1970

3,536,591
MULTIPLE EFFECT DISTILLATION APPARATUS
Charles W. Lotz, South Burlington, Vt., assignor to General Electric Company, a corporation of New York
Filed July 2, 1962, Ser. No. 206,878
Int. Cl. B01d 3/02
U.S. Cl. 202—174
2 Claims This invention relates generally to distillation apparatus and more particularly to an improved multiple effect saline water distillation apparatus.

Arbitrarily, water is considered to be "saline" when it contains 1000 or more parts of salt per million parts of water, while it is considered to be fresh when it has fewer than 1000 parts per million of salt. Sea water contains about 35,000 parts per million of salt.

The increasing demands for fresh water in many areas of the world has given impetus to investigations for ways of converting saline water into fresh water in a manner which can be economically justified. One well known process for obtaining fresh water from saline water is that of distillation, which may be performed by bringing the saline water or distilland into contact with a heated surface in order to evaporate the water and leave the dissolved salts behind and then condensing the vapors which are produced upon a relatively cool surface to form fresh water.

The distillation process can be performed more economically if the heat of vaporization which is extracted from the vapors in obtaining distillate is reused to heat or evaporate additional saline water, thereby reducing the total heat which must be supplied, and hence the cost of accomplishing the distillation. Such an approach is utilized in multiple effect distillation, where the extracted heat of vaporization is given up to the condensing surface of a heat transfer wall while the opposite surface of the same wall constitutes an evaporating surface for additional saline water. The resulting vapors are condensed on one surface of still another heat transfer wall which may also be used to evaporate distilland from its opposite surface. It is possible to evaporate water on one side of a wall merely by condensing vapors on the opposite side if the pressure on the evaporating side is sufficiently less than the pressure on the condensing side. For example, if the vapor on the condensing side of the wall is at a pressure of about 14 inches of mercury and about 177° Fahrenheit, it can be utilized to evaporate water at a pressure of about 13 inches of mercury since the saturation temperature at this pressure is about 173° F. It can be seen that a 4 F. degree temperature difference exists across the wall which will permit the necessary heat to be transferred through the wall at a rate which will be sufficient provided that the resistance to heat transfer of the wall is sufficiently low.

Ordinarily there is made available, for distillation purposes, steam at a particular temperature and pressure, and a supply of cooling water at a particular temperature, which may be used as a heat sink. These temperatures, therefore, may be considered as establishing the limits within which the multiple distillation effects must be performed. As a general rule, more water can be distilled if more effects or stages can be achieved within the given temperature limits.

Among the problems associated with the distillation of saline water, the most predominant is that of high cost. This cost is composed of the initial cost of the apparatus to be used, together with the cost of operating and maintaining the apparatus after it is installed. The initial cost of the apparatus can be reduced if the design does not require complicated parts; that is, if flat plates can be used, if no moving parts are required, and if exacting tolerances are unnecessary. The cost of operating and maintaining the apparatus can be reduced if the heat transfer walls have a minimum resistance to heat flow and if scaling problems are reduced.

It is, therefore, an object of this invention to provide multiple effect distillation apparatus in which the temperature difference between stages is minimized so that the number of distillation stages which can be incorporated in apparatus operating in a limited range of temperatures is maximized.

It is also an object of this invention to provide a multiple effect distillation apparatus in which the arrangement of the structure establishes the small temperature difference between stages to be maintained.

It is a further object of this invention to provide a multiple effect distillation apparatus which will be economical to manufacture and operate.

In carrying out the invention, in one form, a plurality of distillation compartments are constructed within a chamber. Each of these compartments has a lower heat transfer wall which is inclined with respect to the local vertical at some angle such as 70 degrees and which has a top surface constituting an evaporating surface. Each compartment also has a similarly inclined upper heat transfer wall having a bottom surface which constitutes a condensing surface for the vapors which are produced. These compartments are disposed one above another, giving the appearance, in cross-section, of a number of parallelograms.

The heat transfer walls which are used are of a unique design comprising a plurality of elongated parallel protuberances separated by depressions. These walls are oriented in the multiple effect distillation apparatus of this invention so that the protuberances lie parallel to the direction of inclination.

Feed liquid or distilland is introduced in the lowest distillation compartment at the upper end of the inclined evaporating surface so that it will flow down this surface under the influence of gravity. A portion of this distilland evaporates (since this evaporating surface has been heated, for example by steam on the opposite surface of the wall), producing vapors which fill the compartment and build up pressure. These vapors are condensed on the bottom surface of the heat transfer wall above and the resulting distillate flows down the surface and is collected at the lower edge of this condensing surface. The adhesion of the distillate to the condensing surface is sufficient to prevent the majority of this distillate from falling back down to the evaporating surface. The pressure of the vapors in the compartment is sufficient to cause the unevaporated distilland to rise through a passageway or liquid leg, as it may be called, to the next highest distillation compartment which is maintained at a lower pressure. The distilland is distributed on the evaporating surface in this compartment and flows down this surface which has been heated by the condensing vapors on its opposite surface, so that more distilland evaporates.

This arrangement may be repeated in each of the thirty or more compartments which may be stacked in the container, with additional distillate being produced in each compartment.

The invention will be better understood from the following description taken in connection with the accompanying drawing in which.

Figure 1:
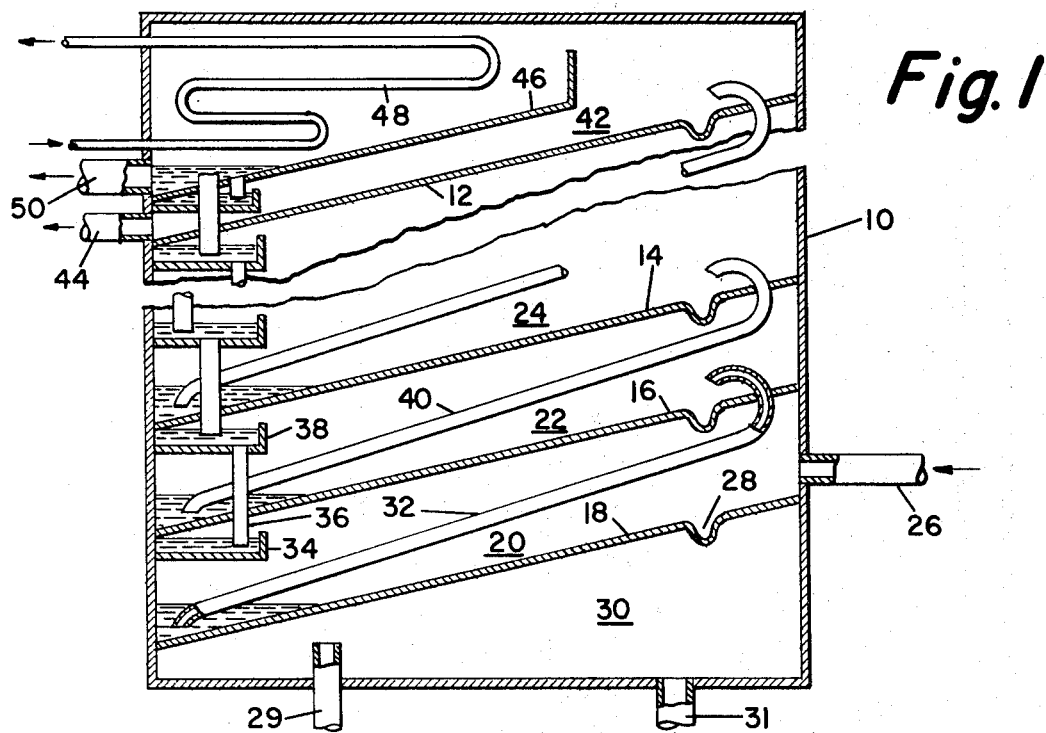
FIG. 1 shows, in cross-section, an elevation of one embodiment of a multiple effect distillation apparatus according to this invention.

Referring now to FIG. 1, a multiple effect still constructed in accordance with the invention is shown. Chamber 10 is provided to contain the various liquid and vapor phases and to support a plurality of inclined heat transfer walls 12, 14, 16, and 18. The construction of these walls will be described in connection with FIG. 3. Heat transfer walls 12–18 are sealed to the chamber on all edges, thereby dividing chamber 10 into a plurality of similar compartments such as 20, 22 and 24. Normally, heat insulating material would be applied around chamber 10; however, it has not been shown for the sake of clarity.

Previously heated distilland is admitted to chamber 10 through pipe 26. The distilland is substantially evenly distributed along the upper edge of heat transfer wall 18 so that the entire top surface of wall 18 will be utilized as the distilland flows down. This distribution may be accomplished by providing a gutter 28 near the upper edge.

The bottom surface of heat transfer wall 18 is heated, for example by introducing steam into compartment 30 through inlet pipe 29 or by utilizing electric heating elements on the bottom surface of wall 18. The condensate which forms in compartment 30 is removed through outlet pipe 31. Heat is transferred through wall 18 to the top surface of this wall and consequently to the distilland flowing over this surface. A portion of the distilland evaporates while the remainder collects in the lower area of compartment 20. A conduit 32 is provided in compartment 20, with its inlet positioned in the collected distilland. As more vapor is produced in compartment 20, the pressure increases, causing the distilland to rise in conduit 32 until it flows into compartment 22.

The liquid leg formed by using conduit 32 causes the pressure in compartment 22 to be less than that in compartment 20. At this lower pressure, the distilland will evaporate at a lower temperature, cooling the top surface of heat transfer wall 16 to this lower temperature. A temperature difference, therefore, exists between the top and bottom surfaces of this wall and heat is transferred through it. This heat is extracted from the vapors in compartment 20, causing these vapors to condense on the bottom surface of heat transfer wall 16. The distillate flows down this bottom surface to the lower edge where it is collected in gutter 34.

A pipe or riser 36, having its inlet positioned in gutter 34, is used to convey the distillate to a similar gutter 38 located in compartment 22. A constriction or valve, not shown, must be provided in riser 36 to maintain the pressure difference established by the liquid leg of conduit 32.

The heat of vaporization which has been extracted from the vapors in compartment 20 as they condense is transferred through wall 16 to the distilland in compartment 22 so that further evaporation of distilland can occur in this compartment. In a manner similar to that described with respect to compartment 20, the vapors produced in compartment 22 are condensed on the bottom surface of heat transfer wall 14, are collected in gutter 38, and conveyed to compartment 24. The heat from these condensing vapors is transferred through wall 14 to compartment 24, and the distilland which has not been evaporated in compartment 22 rises through conduit 40 to compartment 24.

In the upper portion of container 10 is located the final distillation compartment 42. Excess distilland which is not evaporated on the top surface of heat transfer wall 12 is removed through pipe 44 as a concentrated brine solution. In operation of the apparatus an excess of distilland is always supplied to limit the formation of scale by the precipitation of the dissolved salts. Some of the vapors produced in compartment 42 may be condensed on the bottom surface of wall 46; however, most of the vapors flow around this wall and are condensed on heat exchanger 48. Heat exchanger 48 may be cooled by using cold incoming saline water which can thereafter be used as the supply of distilland. The distillate condensed in compartment 42, together with that conveyed to this compartment by the various risers, is removed from container 10 through pipe 50.

In a typical multiple effect distillation apparatus, the vertical distance between heat transfer walls can be made about 2 inches. The vertical distance of the liquid leg may be about 24 inches. The temperature difference across the heat transfer walls will then be on the order of 4 Fahrenheit degrees. Heat transfer walls 12–18 may be inclined at an angle of from 8 degrees with the horizontal up to 30 degrees. The particular angle to be selected depends upon the rate of heat transfer through the wall. If heat is rapidly extracted from the vapors, the distillate rapidly accumulates on the condensing surface and will flow down even when the inclination is small. If distillate forms at a slower rate, the flow will be facilitated by an increased inclination.

Figure 2:
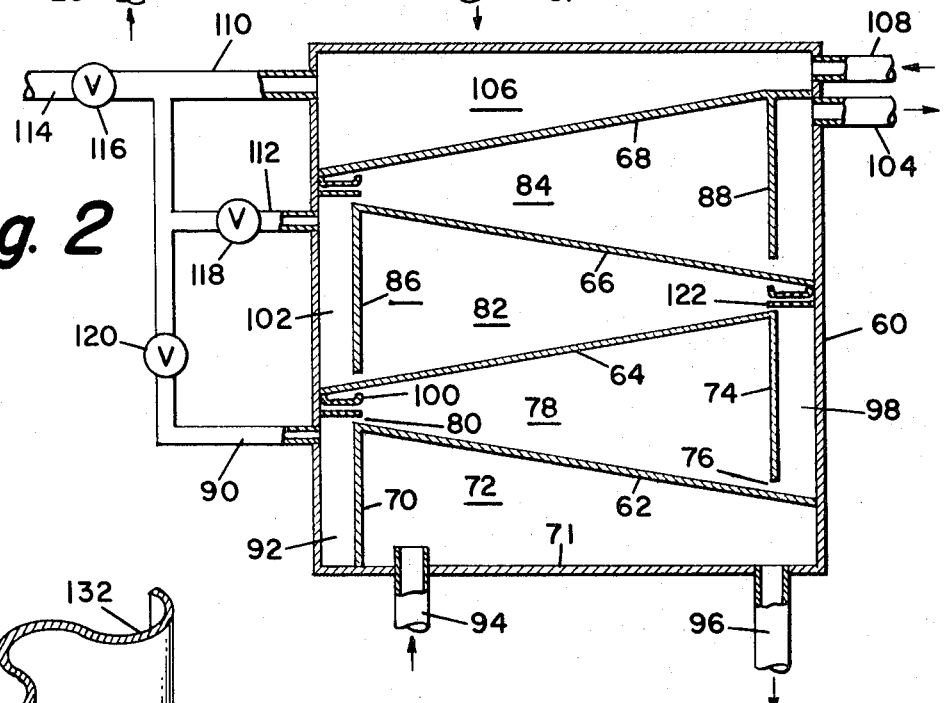
FIG. 2 shows, in cross-section, an elevation of another embodiment of this invention.

Referring next to FIG. 2, a second embodiment of the invention will be described. Chamber 60 contains heat transfer walls 62, 64, 66 and 68. The construction of these walls will be described in connection with FIG. 3. Heat transfer walls 62–68 are sealed to the walls of chamber 60 on their lower edge and side edges, with the upper edge of each of these walls being displaced from the adjacent wall of chamber 60. Depending from the upper edge of heat transfer wall 62 is a substantially vertical plate 70. Plate 70 is sealed to the floor 71 and the side walls of chamber 60 which would be parallel to the plane of FIG. 2, so that plate 70 and heat transfer wall 62, together with the walls and floor of chamber 60, define compartment 72.

In a similar manner, depending from the upper edge of heat transfer wall 64 is provided plate 74. Plate 74 while being sealed to the walls of chamber 60 at its side edges is displaced slightly from the upper surface of heat transfer wall 62, providing an outlet passage 76 from compartment 78 which is defined by the heat transfer walls 62 and 64, the side walls of chamber 60, and depending plate 74. An inlet passage 80 to compartment 78 is provided at the upper edge of heat transfer wall 62.

Compartments 82 and 84 are similarly constructed by providing depending plates 86 and 88 from the upper edges of heat transfer walls 66 and 68 respectively. Provision is made for supplying a regulated flow of distilled through inlet pipe 90 to the space 92 defined by depending plate 70 and the contiguous walls of chamber 60. Space 92 will become filled with the distilland supplied and finally overflow through inlet pasage 80 and down the top surface of heat transfer wall 62. In order to evaporate the distilland flowing down the top surface of heat transfer wall 62, heat must be supplied to the bottom surface of this wall. A convenient method of supplying the necessary heat is to provide steam through inlet pipe 94 to chamber 72. An outlet pipe 96 is provided for removing any steam which condenses in chamber 72 and any necessary vapor traps, etc., not shown, may be supplied to conserve the energy of this steam.

As the bottom surface of heat transfer wall 62 becomes heated, heat will pass through this wall to the upper surface where a portion of the distilland flowing down this surface will be evaporated. The vapors will be restrained in compartment 78 by heat transfer wall 64 and depending plate 74. That distilland which is not evaporated will flow through outlet passage 76 into liquid leg 98. The distilland will rise in liquid leg 98 as the vapor pressure in compartment 78 increases until distilland overflows from liquid leg 98 into compartment 82, flowing down the top surface of heat transfer wall 64 in the same manner described with respect to heat transfer wall 62.

The presence of liquid leg 98 provides a pressure difference between compartments 78 and 82. Compartment 78 is at a pressure greater than compartment 82 by an amount approximately equal to the height of liquid leg 98 multiplied by the specific gravity of the distilland contained in this liquid leg.

Because of this difference in pressure, distilland on the upper surface of heat transfer wall 64 will evaporate at a temperature lower than that required to evaporate distilland in compartment 78. The evaporation of distilland from the upper surface of heat transfer wall 64 makes this surface cool relative to the lower surface so that heat flows through wall 64. This cools the lower surface of wall 64, causing the vapors in the vicinity of the lower surface to condense on the lower surface. The condensed vapors or distillate on the lower surface of heat transfer wall 64 will flow down this wall under the influence of gravity to the bottom edge of heat transfer wall 64 where a trough or gutter 100 is provided to collect the distillate. The distillate collected in gutter 100 may be collected at one end of chamber 60 and piped to the point of use.

In a similar manner, the distilland will rise in liquid leg 102 until it overflows into compartment 84 where another stage of evaporation and condensation will occur. This arrangement can be carried out through further stages with a pressure drop between each stage provided by a liquid leg. Any distilland remaining after the last stage of distillation has occurred may be piped out through pipe 104. The necessary cooling of the upper surface of the heat transfer wall of the last stage (in FIG. 2 heat transfer wall 68) may be provided by supplying the distilland to compartment 106 through inlet pipe 108. In condensing the vapors on the lower surface of heat transfer wall 68, the heat which is extracted serves to preheat the distilland which may then be supplied through pipe 110 to the first stage of the distillation apparatus.

In some cases, the quantity of distilland evaporated in one or more compartments may be such that a distilland make-up should be provided. This make-up may be provided by the addition of a further inlet pipe 112.

If more distilland is provided to compartment 106 than can be utilized, excess distilland can be piped overboard through pipe 114. Suitable valves 116, 118 and 120 may be provided to control the flow of distilland as described.

The flow of distilland into a distillation compartment such as 82 can be additionally controlled by providing a plate or flap 122 although in some cases this function may be provided by the bottom surface of the gutter.

For most uses, more distillation effects than the three shown in FIG. 2 would be provided.

Figure 3:
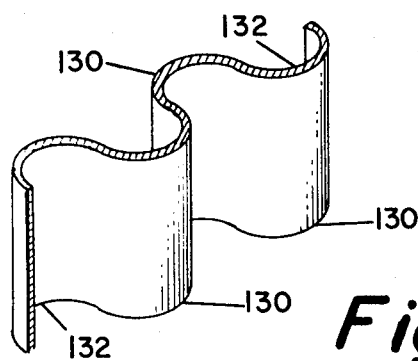
FIG. 3 is an isometric detail of the heat transfer wall used in this invention.

Referring next to FIG. 3, the construction of the heat transfer walls preferably used in apparatus such as shown in FIGS. 1 and 2 will be described. The walls are designed so that both surfaces have a plurality of elongated parallel protuberances 130 separated by depressions 132. The walls are made of a material having a low resistance to heat flow, e.g. copper or aluminum. Condensing vapors tend to collect in depressions 132, although they will condense over the crests of protuberances 130 as well. Distilland will also tend to collect in depressions 132 but on the opposite surface, however, the boiling of the distilland tends to spread it over the crests of protuberances 130. In the distillation apparatus of this invention, the wall would be mounted so that protuberances 130 are parallel to the direction of inclination. A more detailed description of these heat transfer walls can be found in the U.S. patent application entitled "Distillation Apparatus," filed Mar. 1, 1962, and having Ser. No. 176,711 and now abandoned.

While particular embodiments of a multiple effect distillation apparatus have been shown and described, it will be obvious that changes and modifications can be made without departing from the spirit of the invention and the scope of the appended claims.

What is claimed as new and desired to be secured by Letters Patent of the United States is:

1. Distillation apparatus comprising:
a plurality of distillation compartments,
said compartments being disposed one above another,
each of said compartments having an inclined upper heat transfer wall constituting a condensing surface and a reversely inclined lower heat transfer wall constituting an evaporating surface,
said heat transfer walls having on each surface a plurality of elongated parallel protuberances separated by depressions, means for conveying distilland from the lower edge of each of said evaporating surfaces to the upper edge of the next highest evaporating surface, comprising a distilland-filled conduit establishing a pressure difference between compartments equal to the liquid leg,
means for introducing distilland to the lowest of said evaporating surfaces,
means for collecting distillate from each of said condensing surfaces, and
means for heating the lowest of said evaporating surfaces.

2. Distillation apparatus comprising:
a chamber,
a plurality of heat transfer walls all inclined at an angle with the horizontal of from 8 degrees to 30 degrees positioned in said chamber,
said heat transfer walls having on each surface a plurality of elongated parallel protuberances separated by depressions,
said heat transfer walls being sealed to the walls of said chamber at their lower and inclined edges,
a plate depending from the upper edge of each of said heat transfer walls to a location adjacent and spaced from a lower heat transfer wall,
said plate being sealed to the walls of said chamber at its side edges, and spaced from the chamber wall to define a uniform conduit from the lower edge of a heat transfer wall to the upper edge of a higher heat transfer wall,
means for introducing distilland on the upper edge of the top surface of the lowest of said heat transfer walls,
means for collecting distillate from the lower edge of the bottom surface of each higher heat transfer wall, and
means for heating the bottom surface of said lowest heat transfer wall.

References Cited

UNITED STATES PATENTS

| | | | |
|---|---|---|---|
| 40,562 | 11/1863 | Hoyt | 159—15 X |
| 40,662 | 11/1863 | Miller | 159—15 |
| 643,794 | 2/1900 | Harvey | 159—18 |
| 1,069,829 | 8/1913 | Thoens et al. | 202—174 |
| 1,378,716 | 5/1921 | Nielsen et al. | 159—15 X |
| 1,524,184 | 3/1925 | Lawrence | 159—18 |
| 1,562,760 | 11/1925 | Harris | 159—15 |
| 1,857,535 | 5/1932 | Elliston | 159—15 X |
| 2,435,424 | 2/1948 | Crews | 159—18 |
| 2,750,999 | 6/1956 | De Vries | 159—18 |

FOREIGN PATENTS 205,057   3/1955   Australia.

WILBUR L. BASCOMB, JR., Primary Examiner

U.S. Cl. X.R.

202—180, 236; 203—11, 88, 89; 159—15, 18